United States Patent [19]
Bennett

[11] Patent Number: 5,764,229
[45] Date of Patent: Jun. 9, 1998

[54] METHOD OF AND SYSTEM FOR UPDATING DYNAMIC TRANSLUCENT WINDOWS WITH BUFFERS

[75] Inventor: Paul William Bennett, Round Rock, Tex.

[73] Assignee: International Business Machines Corporation, Armonk, N.Y.

[21] Appl. No.: 647,131

[22] Filed: May 9, 1996

[51] Int. Cl.⁶ ........................................................ G06F 3/00
[52] U.S. Cl. ........................................................ 345/345
[58] Field of Search ................................... 395/326–358; 345/119–120, 145–146, 326–358, 114, 435

[56] References Cited

U.S. PATENT DOCUMENTS

| | | | |
|---|---|---|---|
| 4,622,545 | 11/1986 | Atkinson | 395/340 X |
| 4,868,765 | 9/1989 | Diefendorff | 364/521 |
| 4,918,625 | 4/1990 | Yan | 364/522 |
| 5,017,143 | 5/1991 | Backus et al. | 434/236 |
| 5,265,202 | 11/1993 | Krueger et al. | 395/158 |
| 5,283,560 | 2/1994 | Bartlett | 345/146 |
| 5,293,470 | 3/1994 | Birch et al. | 395/135 |
| 5,327,509 | 7/1994 | Rich | 382/17 |
| 5,377,314 | 12/1994 | Bates et al. | 395/135 |
| 5,428,744 | 6/1995 | Webb et al. | 395/164 |
| 5,452,414 | 9/1995 | Rosendahl et al. | 395/149 |
| 5,463,728 | 10/1995 | Blahut et al. | 395/158 |
| 5,487,145 | 1/1996 | Marsh et al. | 395/162 |
| 5,530,795 | 6/1996 | Wan | 395/329 |
| 5,581,670 | 12/1996 | Bier et al. | 395/326 |
| 5,651,107 | 7/1997 | Frank et al. | 395/344 |

OTHER PUBLICATIONS

Foley et al., "Computer Graphics: Principles and Practice", Addison–Wesley Pub. Co., pp. 443–449, 754–758, 996–998. Nov. 1993.

Henshaw et al., "Translucent Windows: Dragging an Image without Obscuring the Desktop", *IBM Technical Disclosure Bulletin*, vol. 37, No. 10, Oct. 1994, p. 15.

*Primary Examiner*—John E. Breene
*Attorney, Agent, or Firm*—Mark S. Walker; Brian F. Russell; Andrew J. Dillon

[57] ABSTRACT

A method of and system for implementing dynamic translucent windows in a graphical user interface. Each translucent window has associated therewith a foreground buffer and a background buffer. Whenever a translucent window is updated, the system, starting with the lowest z-order updated translucent window, combines the updated translucent window's foreground and background buffers into a translucent image. If the translucent image is in a clip region, the system displays the portion of the translucent image in the clip region and turns off the update marker. If the translucent image is in a deferred clip region, the system copies the portion of the translucent image in any deferred clip region into the background buffer or buffers of the translucent window or windows that define the deferred clip region and marks the translucent window updated. The system then goes to the next lowest z-order updated translucent window and repeats the process until the topmost window is reached, thereby to propagate the translucency effect up through the stack of windows.

9 Claims, 6 Drawing Sheets

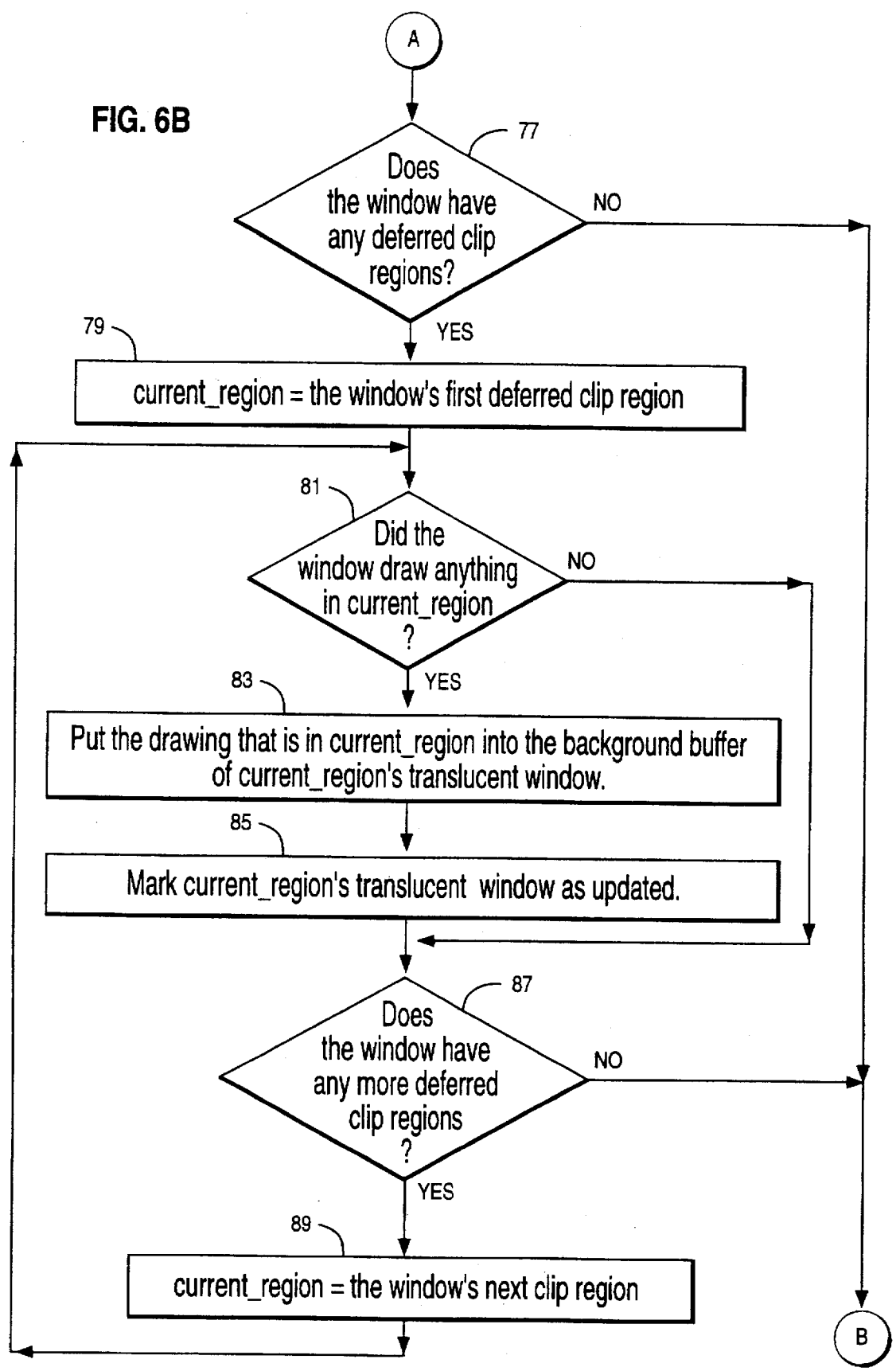

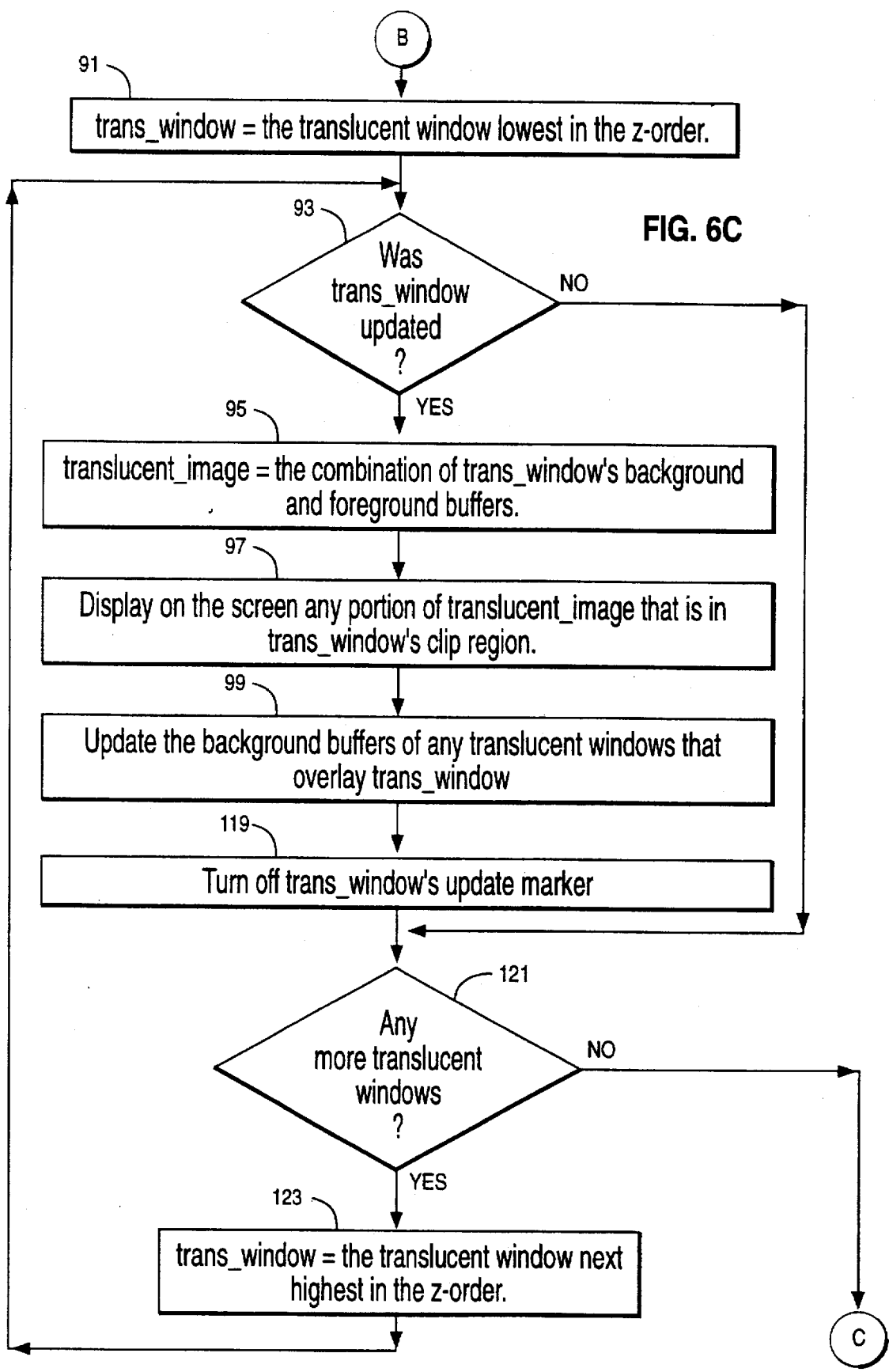

METHOD OF AND SYSTEM FOR UPDATING DYNAMIC TRANSLUCENT WINDOWS WITH BUFFERS

FIELD OF THE INVENTION

The present invention relates generally to computer system user interfaces and more particularly to an improved method of and system for implementing dynamic translucent windows in a computer system graphical user interface.

BACKGROUND OF THE INVENTION

Description of the Prior Art

Graphical user interfaces in windowing environments can display multiple windows. Typically, each window displayed provides a user interface to a separate application. When several windows are displayed, they are usually displayed in overlapping fashion.

Graphical user interface systems typically provide only opaque windows. When one window overlays another window, the top window completely obscures the view of any portion of any windows that lie directly beneath it. The order in which windows are stacked on the display is referred to as "z-order." A window overlays any windows that are below it in z-order and is overlaid by any window that is above it in z-order.

The window at the top of the z-order is not obscured by any other windows and is usually the "active" window, in that it can receive user input. However, in multitasking environments, the windows beneath the top window in z-order are associated with active applications and they can be drawn into.

In systems with only opaque windows, the system does not allow material to be drawn into any portion of a window that is overlaid by a window above it in z-order. A window that is only partially obscured has a portion defined as its clip region that is visible on the display. Anything that is drawn into the clip region of a partially obscured window is displayed, but anything drawn outside the clip region is simply discarded.

A user may wish to see what is drawn into windows that are beneath other windows in z-order. A user may be alerted that something has been drawn into an obscured window by observing a change in the contents of the clip region of the obscured window, but the user must surface the obscured window in order to see its contents.

It is therefore an object of the present invention to provide translucent windows that allow a user to see material draw into windows that are covered by other windows. It is a further object of the present invention to provide translucent windows that are dynamically updated as material is drawn into windows that are covered by other windows.

SUMMARY OF THE INVENTION

In accordance with the present invention, a translucent window is a window that shows those portions of any windows that lie beneath it, while still displaying the translucent window. The images of windows beneath the translucent window are combined with the image of the translucent window so that elements of both are visible at the same time. An opaque window is a window that completely obscures any portion of any window that lies beneath it.

Each translucent window has associated therewith a foreground buffer and a background buffer. The foreground buffer contains the native contents of the window, i.e. anything that is drawn into the window. The background buffer contains an image of all the windows that lie beneath the translucent window. Translucency is accomplished by combining the contents of the background and foreground buffers to form a translucent image.

A clip region is a portion of a window that is not obscured by any window above it in z-order. When a window is on the top of a stack of windows, the entire window is in its clip region. In accordance with the present invention, a deferred clip region is a portion of a window that is directly overlaid by a translucent window. Thus, a translucent window that directly overlays another window defines a deferred clip region in the overlaid window, and the overlaying translucent window may be referred to as the deferred clip region's translucent window. In the context of the present invention, directly overlaid means there are no other windows, translucent or opaque, between the window and the portion of the translucent window that overlays it.

Whenever the an application draws into a window, if the window is opaque and has a clip region, then the system displays the drawing in the clip region. If the opaque window has a deferred clip region, then the system draws the drawing into the background buffer of the any translucent window that defines the deferred clip region and marks the translucent window updated.

If the window is translucent, then the system draws the drawing into the foreground buffer of the window and marks the translucent window updated.

Whenever a translucent window is updated, the system, starting with the lowest z-order updated translucent window, combines the updated translucent window's foreground and background buffers into a translucent image. If any of the translucent image is in the translucent window's clip region, the system displays the portion of the translucent image in the clip region and turns off the update marker. If any of the translucent image is in a deferred clip region, the system copies the portion of the translucent image in any deferred clip region into the background buffer or buffers of the translucent window or windows that define the deferred clip region and marks the translucent window updated. The system then goes to the next lowest z-order updated translucent window and repeats the process until the topmost window is reached, thereby to propagate the translucency effect up through the stack of windows.

BRIEF DESCRIPTION OF THE DRAWINGS

FIGS. 6A–C are a flowchart of a preferred software implementation of the present invention.

DETAILED DESCRIPTION OF THE PREFERRED EMBODIMENT

Figure 1:
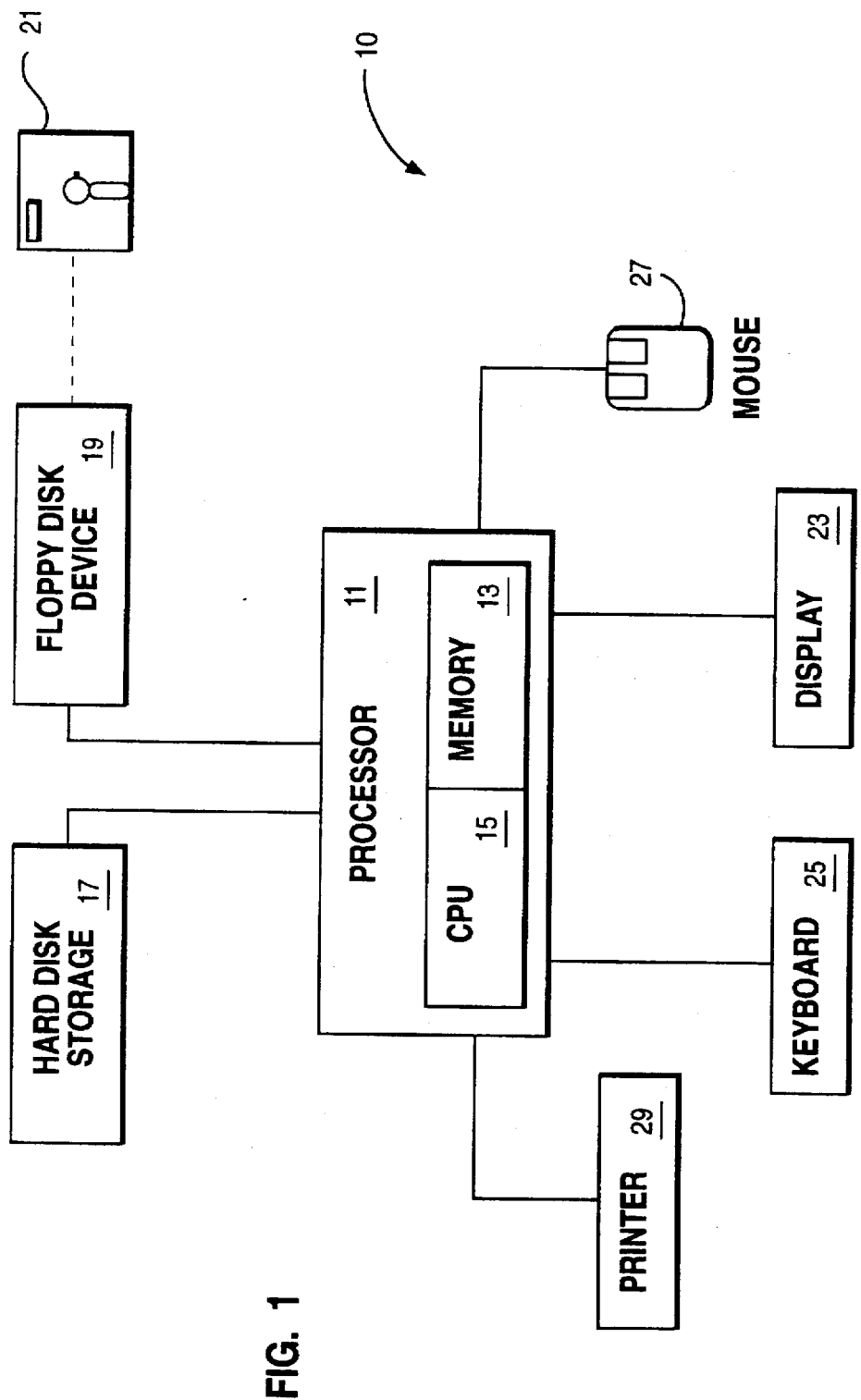
FIG. 1 is block diagram of a computer system according to the present invention.

Referring now to the drawings, and first to FIG. 1, a block diagram of a personal computer with which the system and method of the present invention may be implemented is designated generally by the numeral 10. System 10 includes a processor 11, which includes a central processing unit (CPU) 13 and random access memory 15. System 10 also includes additional memory in the form of a disk storage device 17 and a floppy disk device 19. Floppy disk device 19 is adapted to receive a diskette 21 that has recorded thereon software including a software implementation of the present invention. System 10 also includes user interface hardware including a display 23, a keyboard 25, and a mouse 27. The system also includes a printer 29.

Figure 2:
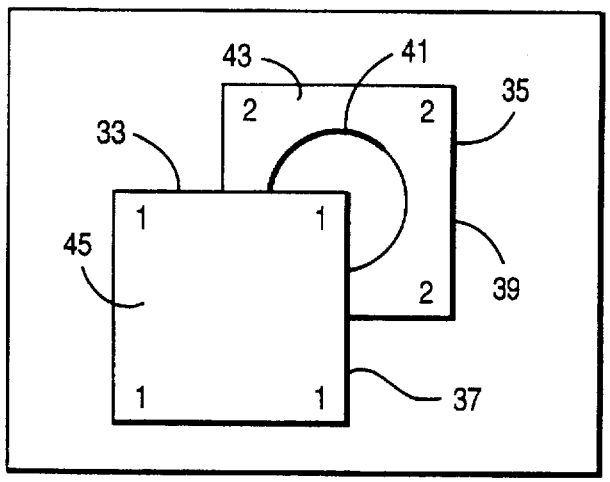
FIG. 2 is a pictorial view of a computer display according to the prior art.

Referring now to FIG. 2, there is shown a pictorial representation of a computer display screen, designated generally by the numeral 31, according to the prior art. Screen 31 has displayed thereon a first window 33 that partially overlays a second window 35. For purposes of illustration, first window 33 includes a window border 37 and it has drawn in each of its corners a numeral "1". Second window 35 includes a window border 39 and it has drawn in each of its corners a numeral "2" and in its center a circle 41. First window 33 is opaque in the sense that it completely obscures the portion of second window 35 that it overlays.

The portion of second window 35 that is visible in FIG. 2 is its clip region 43. Whenever the system draws into second window 35, anything in clip region 43 is displayed and anything outside clip region 43 is discarded. Since first window 33 is not obscured by any other window, its entire area comprises a clip region 45.

Figure 3:
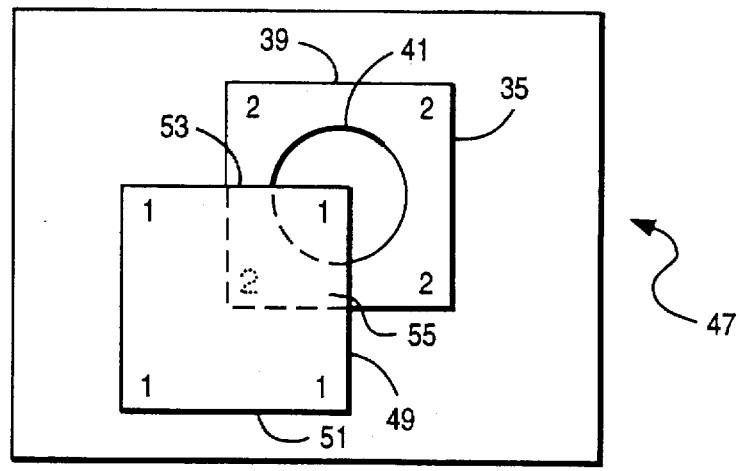
FIG. 3 is a pictorial view of a computer display according to the present invention.

Referring now to FIG. 3, there is shown a pictorial representation of a display screen, designated generally by the numeral 47, similar to screen 31 of FIG. 2, except that it includes at least one translucent window 49 according to the present invention. Translucent window 49 is similar to first window 33 of FIG. 2 in that it includes a window border 51 and it has a numeral "1" displayed at each of it corners. However, translucent window 49 also has displayed therein a phantom or translucent image 53 that shows the portion of second window 35 that translucent window 49 overlays.

According to the present invention, second window 35 includes, in addition to clip region 43, a deferred clip region 55. Deferred clip region 55 is defined by the portion of second window 35 that is overlaid by translucent window 49. For clarity of illustration only two windows are illustrated in the drawings, but those skilled in the art will recognize that in typical computer displays several windows may be stacked in overlapping fashion. In the general case, a deferred clip region is defined by that portion of a translucent window that directly overlays a window in the sense that there are no intervening windows in z-order between the deferred clip region and the translucent window that defines the deferred clip region. Thus, a single window may have multiple deferred clip regions defined by the portion of each translucent window that directly overlays it, but a deferred clip region of a window is defined by only a single translucent window.

Figure 4:
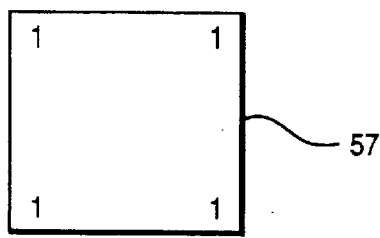
FIG. 4 is a graphical representation the contents of a foreground buffer according to the present invention.
Figure 5:
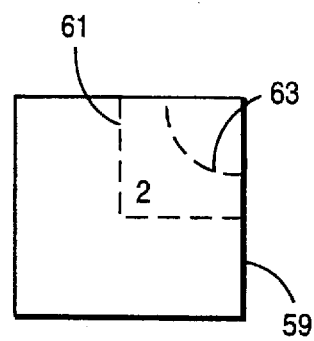
FIG. 5 is a graphical representation the contents of a background buffer according to the present invention.

Translucent windows according to the present invention include foreground buffers and background buffers. Referring to FIGS. 4 and 5, the contents of the foreground buffer for translucent window 49 of FIG. 3 is represented in FIG. 4 by the numeral 57, and the contents of the background buffer for translucent window 49 is represented in FIG. 5 by the numeral 59. Foreground buffer 57 contains the native contents of translucent window 49. Foreground buffer 57 thus contains everything that the application associated with translucent window 49 draws into it.

Background buffer 59 contains an image of the windows that translucent window 49 overlays. Thus, background buffer 59 contains the corner of second window 35, including a portion 61 of window border 39, a numeral "2", and a portion 63 of circle 41. As will be discussed in greater detail below, background buffer 59 contains an image of the material drawn into the deferred clip regions defined by translucent window 49. Translucent window 49 is formed by combining buffers 57 and 59, using known color combination techniques, to form a translucent image that is displayed on screen 47.

Figure 6A:
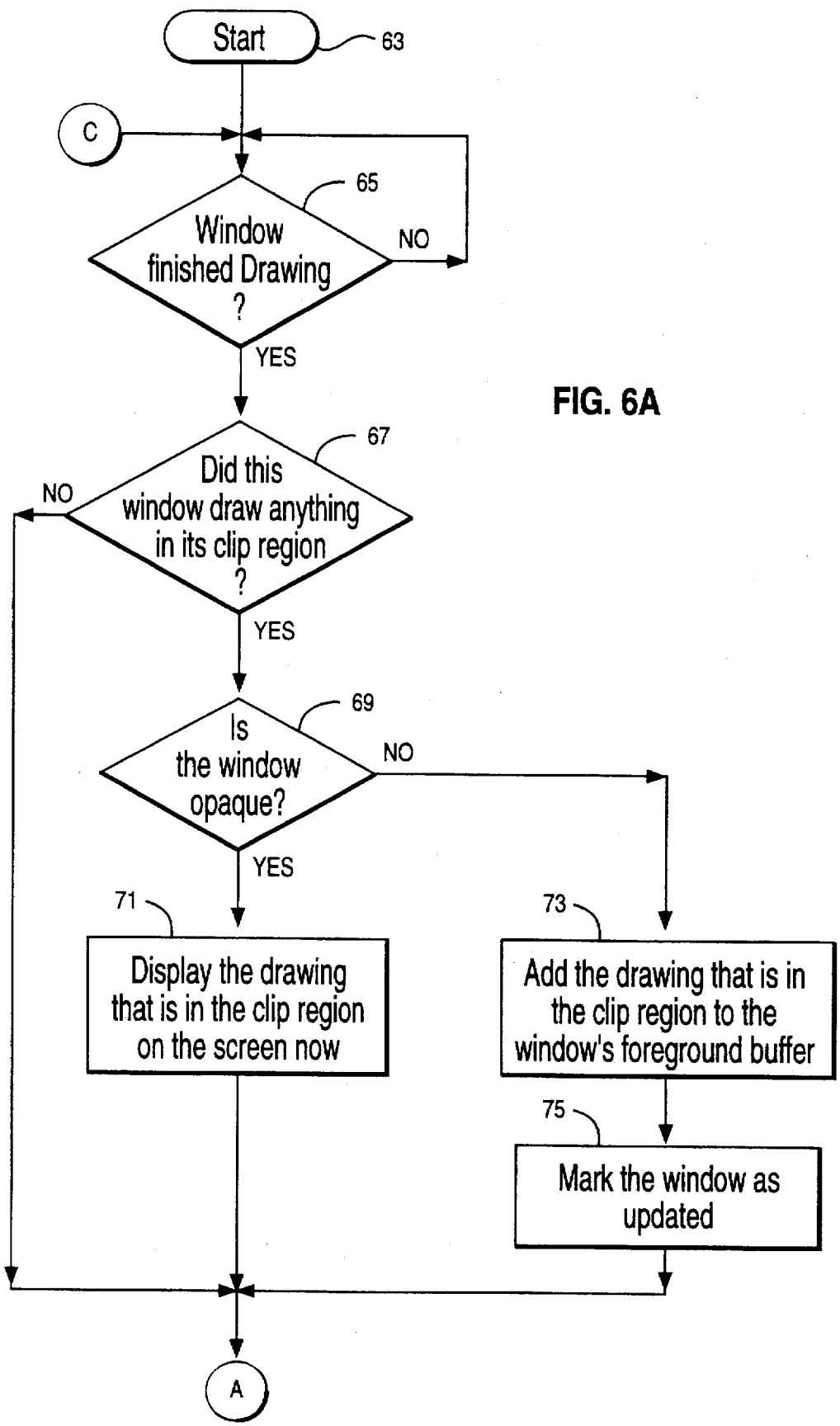

Referring now to FIGS. 6A–C, there is shown a flow chart of the logic of a preferred software implementation of the algorithm of the present invention that executes when a window finishes drawing. The process starts at block 63 and the system waits until something is drawn into a window. In the preferred embodiment the system waits at decision block 65 until a drawing finishes drawing. GUI systems typically have mechanisms for determining that a window is finished drawing. For example, the preferred OS/2 operating system issues the message WM_ENDPAINT when a window finishes drawing. The check for drawing ended is added for performance reasons, so as not perform the algorithm for every atomic drawing operation.

After a window finishes drawing, the system test at decision block 67 whether anything has been drawn into the window's clip region. If so, the system test at decision block 69 whether or not the window is opaque. If so, the system displays the drawing that is in the clip region immediately at process block 71. If at decision block 69 the window is not opaque, i.e. the window is translucent, the system adds the drawing that is in the window's clip region to the windows foreground buffer at process block 73 and marks the window as updated at block 75. Opacity or translucency is an attribute of a window that may be fixed when the window is created or alterable by a user.

Referring now to FIG. 6B, the system tests at decision block 77 whether the window has any deferred clip regions, i.e. if it is overlaid by any translucent windows. If so, the system sets the current_region equal to the window's first clip region at block 79. The system then tests at decision block 81 whether anything is drawn in the current region. If so, the system puts that drawing into the background buffer of the current_region's translucent window at process block 83 and marks the current_region's translucent window as updated at block 85. The system then tests at decision block 87 whether the window has any more deferred clip regions. If so, the system sets the current_region equal to the window's next deferred clip region at process block 89 and loops back to decision block 81 to repeat the process until the system finds, at decision block 87, that the window has no more deferred clip regions.

Referring now to FIG. 6C, after the system has handled all the deferred clip regions, the system sets trans_window equal to the translucent window lowest in z-order at process block 91. The system then tests at decision block 93 whether trans_window has been marked as updated. If so, the system combines the translucent_window's background and foreground buffers at process block 95 to form translucent_image and then, at process block 97, displays any portion of translucent_image that is in trans_window's clip region. Next, as indicated generally at process block 99, the system updates the background buffers of any translucent windows that overlay trans_window, the details of which are shown if FIG. 7.

Figure 7:
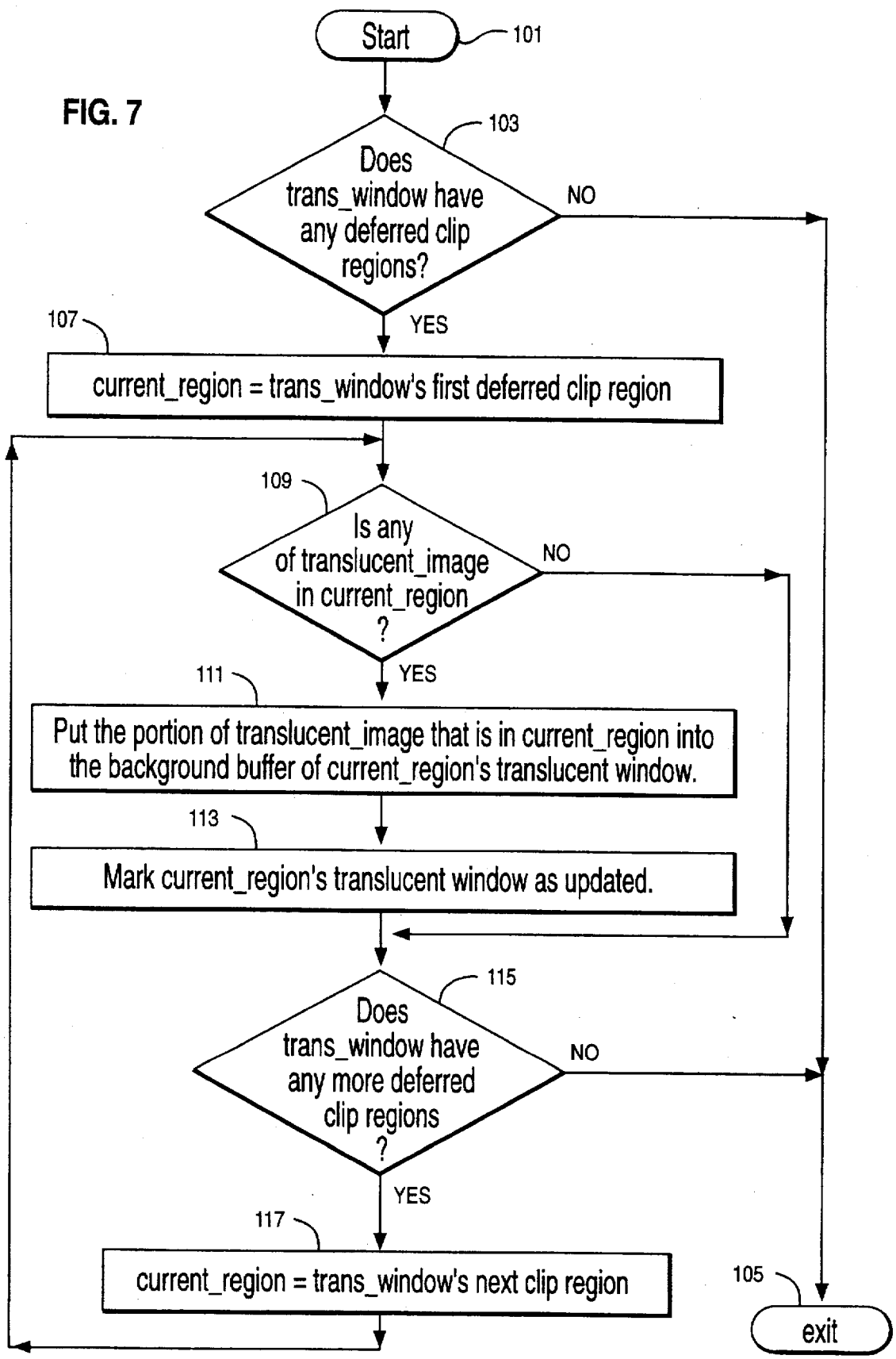
FIG. 7 is a flowchart of a preferred software method of updating the background buffers of translucent windows overlaying another translucent window according to the present invention.

Referring to FIG. 7, the preferred background buffer updating algorithm starts at block 101. The system tests at decision block 103 whether trans-window has any deferred clip regions. If not, the process exits at block 105 and returns to FIG. 6B. If trans_window has any deferred clip regions, the system sets current_region equal to trans-window's first deferred clip region at process block 107. Then, the system tests at decision block 109 whether any portion of translucent_image is in current_region. If so, the system copies the portion of translucent_image that is in current_region into the background buffer of current_region's translucent window at process block 111 and marks current_region's translucent window as updated at block 113. The system then tests at decision block 115 whether trans_window has any more deferred clip regions. If so, the system sets current_region equal to trans_window's next clip region at block 117 and loops back to decision block 109 to repeat the process until the system finds, at decision block 115, that trans_window has no more deferred clip regions, at which time the system exits at block 105 and returns to FIG. 6C.

Referring again to FIG. 6C, after the system has completed the process step shown generally at block 99, the system turns off the update marker on trans_window at block 119 and tests at decision block 121 whether there are any more translucent windows above trans_window in z-order. If so, the system sets trans_window equal to the translucent window next highest in z-order at process block 123 and loops back to decision block 93 to repeat processing until all translucent windows in the stack have been handled, at which time the system returns to FIG. 6A to wait for a window to finish another drawing.

While the invention has been particularly shown and described with reference to a preferred embodiment, those skilled in the art will understand that various changes may be made in form and detail without departing from the spirit and scope of the invention.

While the invention has been shown and described with reference to particular embodiments thereof, it will be understood by those skilled in the art that the foregoing and other changes in form and detail may be made therein without departing from the spirit and scope of the invention.

What is claimed is:

1. A method of implementing translucent windows in a computer system having a display, which comprises the computer implemented steps of:

for each window displayed on said display, defining a clip region that includes a portion of the window not overlaid by any other window and a deferred clip region that includes a portion of the window directly overlaid by a translucent window;

for each translucent window displayed on said display, defining a foreground buffer that contains the contents of the translucent window and a background buffer that contains an image of the deferred clip region of any window directly overlaid by the translucent window; whenever an application draws a drawing into a clip region of a translucent window, adding the drawing to the foreground buffer of said translucent window; and whenever an application draws a drawing into a deferred clip region of a window, adding the drawing to the background buffer of the translucent window that defines said deferred clip region and marking the translucent window that defines said deferred clip region as updated.

2. The method of implementing translucent windows as claimed in claim 1, including the steps of:

combining the background buffer with the foreground buffer of any translucent window having a buffer that has been drawn into to create a translucent image, displaying any portion of said translucent image that is within a clip region of said updated translucent window and copying any portion of said translucent image that is within a deferred clip region of said updated translucent window into the background buffer of the translucent window that defines said deferred clip region.

3. A method of implementing translucent windows in a computer system having a display, which comprises the computer implemented steps of:

for each window displayed on said display, defining a clip region that includes a portion of the window not overlaid by any other window and a deferred clip region that includes a portion of the window directly overlaid by a translucent window;

for each translucent window displayed on said display, defining a foreground buffer that contains the contents of the translucent window and a background buffer that contains an image of the deferred clip region of any window directly overlaid by the translucent window;

whenever an application draws a drawing into a clip region of an opaque window, displaying said drawing in said clip region;

whenever an application draws a drawing into a clip region of a translucent window, adding the drawing to the foreground buffer of the translucent window and marking the translucent window updated;

whenever an application draws a drawing into a deferred clip region of a window, adding the drawing to the background buffer of the translucent window that defines said deferred clip region and marking the translucent window that defines said deferred clip region as updated; and for each updated translucent window, combining the background buffer with the foreground buffer to create a translucent image, displaying any portion of said translucent image that is within a clip region of said updated translucent window and copying any portion of said translucent image that is within a deferred clip region of said updated translucent window into the background buffer of the translucent window that defines said deferred clip region and marking said translucent window as updated.

4. A method of implementing translucent windows in a computer system having a display adapted to display a plurality of windows arranged in a z-order, which comprises the computer implemented steps of:

a) for each window displayed on said display, defining a clip region that includes a portion of the window not overlaid by any other window and a deferred clip region that includes a portion of the window directly overlaid by a translucent window;

b) for each translucent window displayed on said display, defining a foreground buffer that contains the contents of the translucent window and a background buffer that contains an image of the deferred clip region of any window directly overlaid by the translucent window;

c) whenever an application draws a drawing into a clip region of a translucent window, adding the drawing to the foreground buffer of the translucent window and marking the translucent window as updated;

d) whenever an application draws a drawing into a deferred clip region of a window, adding the drawing to the background buffer of the translucent window that defines said deferred clip region and marking the translucent window that defines said deferred clip region as updated; and e) for the updated translucent window having the lowest z-order in said display, combining the background buffer with the foreground buffer to create a translucent image, displaying any portion of said translucent image that is within a clip region of said updated lowest z-order translucent window and copying any portion of said translucent image that is within a deferred clip region of said updated lowest z-order translucent window into the background buffer of the translucent window that defines said deferred clip region, and marking the translucent window that defines said clip region as updated.

5. The method as claimed in claim 4, including the further computer implemented steps of:

unmarking said updated lowest z-order translucent window; and repeating step e).

6. A system for implementing translucent windows in a computer system having a display, which comprises:

means for defining, for each window displayed on said display, a clip region that includes a portion of the window not overlaid by any other window and a deferred clip region that includes a portion of the window directly overlaid by a translucent window;

a foreground buffer for each translucent window displayed on said display, said foreground buffer containing the contents of the translucent window;

a background buffer for each translucent window displayed on said display, said background buffer containing an image of the deferred clip region of any window directly overlaid by the translucent window;

means for adding, whenever an application draws a drawing into a clip region of a translucent window, the drawing to the foreground buffer of said translucent window; and means for adding, whenever an application draws a drawing into a deferred clip region of a window, the drawing to the background buffer of the translucent window that defines said deferred clip region and marking the translucent window that defines said deferred clip region as updated.

7. The system as claimed in claim 6, including:

means for combining the background buffer with the foreground buffer of any translucent window having a buffer that has been drawn into to create a translucent image;

means for displaying any portion of said translucent image that is within a clip region of said updated translucent window; and means for copying any portion of said translucent image that is within a deferred clip region of said updated translucent window into the background buffer of the translucent window that defines said deferred clip region.

8. A system for implementing translucent windows in a computer system having a display, which comprises:

means for defining, for each window displayed on said display, a clip region that includes a portion of the window not overlaid by any other window and a deferred clip region that includes a portion of the window directly overlaid by a translucent window;

a foreground buffer for each translucent window displayed on said display, each said foreground buffer containing the contents of its translucent window;

a background buffer for each translucent window displayed on said display, each said background buffer containing an image of the deferred clip region of any window directly overlaid by the translucent window;

means for displaying, whenever an application draws a drawing into a clip region of an opaque window, said drawing in said clip region;

means for adding, whenever an application draws a drawing into a clip region of a translucent window, the drawing to the foreground buffer of that translucent window and marking the translucent window as updated;

means for adding, whenever an application draws a drawing into a deferred clip region of a window, the drawing to the background buffer of the translucent windows that defines said deferred clip region and marking the translucent window that defines said deferred clip region as updated;

means for combining, for each updated translucent window, the background buffer with the foreground buffer to create a translucent image;

means for displaying any portion of said translucent image that is within a clip region of said updated translucent window;

means for copying any portion of said translucent image that is within a deferred clip region of said updated translucent window into the background buffer of the translucent window that defines said deferred clip region; and means for marking said translucent window as updated.

9. A system for implementing translucent windows in a computer system having a display adapted to display a plurality of windows arranged in a z-order, which comprises:

a) means for defining, for each window displayed on said display, a clip region that includes a portion of the window not overlaid by any other window and a deferred clip region that includes a portion of the window directly overlaid by a translucent window;

b) a foreground buffer for each translucent window displayed on said display, said foreground buffer containing the contents of the translucent window;

c) a background buffer for each translucent window displayed on said display, said background buffer containing an image of the deferred clip region of any window directly overlaid by the translucent window;

d) means for adding, whenever an application draws a drawing into a clip region of a translucent window, the drawing to the foreground buffer of the translucent window and marking the translucent window as updated;

e) means for adding, whenever an application draws a drawing into a deferred clip region of a window, the drawing to the background buffer of the translucent window that defines said deferred clip region and marking the translucent window that defines said deferred clip region as updated;

f) means for combining, for the updated translucent window having the lowest z-order in said display, the background buffer with the foreground buffer to create a translucent image; and g) means for displaying any portion of said translucent image that is within a clip region of said updated lowest z-order translucent window and copying any portion of said translucent image that is within a deferred clip region of said updated lowest z-order translucent window into the background buffer of the translucent window that defines said deferred clip region, and marking the translucent window that defines said clip region as updated.

* * * * *